July 29, 1947.    H. P. KALMUS    2,424,933
RADIATION METER
Filed Jan. 6, 1944

INVENTOR
HENRY P. KALMUS
BY David M. Davis
HIS ATTORNEY

Patented July 29, 1947

2,424,933

UNITED STATES PATENT OFFICE 2,424,933

RADIATION METER

Henry P. Kalmus, Chicago, Ill.

Application January 6, 1944, Serial No. 517,223

5 Claims. (Cl. 250—41.5)

1

This invention relates to light-measuring devices and more particularly to such devices utilizing the principle of emission of electrons in response to the incidence of light.

Photocells in which electrons are emitted from a surface upon the incidence of light thereon produce an extremely small current flow which is usually amplified, as by a direct current amplifier, to usable intensity for the operation of a meter, indicator, or control device. Direct current amplifiers have certain very undesirable characteristics, particularly in that they require extremely high voltage supplies to obtain a large gain and their output is highly dependent upon voltage variation in such supplies. Their output is furthermore responsive to any change in tube characteristics used in the amplifier and is therefore affected by change in cathode emission of any of the tubes and even by changes in ambient temperature.

Such photocell devices have been utilized in combination with alternating current amplifiers in order to avoid such disadvantages of direct current amplifiers. In one arrangement, the light incident on the photocell surface has been modulated, or chopped, by a mechanical arrangement such as a whirling disc with one or more holes in it through which the light passes to the photocell. Such arrangements are awkward, difficult to operate, and subject to many mechanical failures.

An alternative arrangement has been to apply an alternating or pulsating voltage to the electrodes of the photocell so that its minute photoelectric current is modulated at the frequency of the applied alternating or pulsating voltage.

Such a photocell arrangement in which a surface emits electrons upon the incidence of light thereon has an extremely high internal resistance. The internal resistance is, in fact, so high that current flowing through paths necessarily placed in shunt between the photocell electrodes are of the same order of magnitude as the photocell currents themselves. For example, current leakage across the glass surface of the envelope maintaining the vacuum around the electrodes and the photoelectric surface is usually almost as large as the photocell current itself. When an alternating or pulsating voltage is applied between the photocell electrodes, this current leakage across the glass envelope is modulated as well as the photocell current itself, and both modulated voltages, or currents, are amplified through the alternating current amplifier, thereby giving a false indication of photocell current, or at the

2 best giving no indication of the point at which light intensity on the photosensitive surface is so small that electrons cease to be emitted by the surface.

It is an object of my invention to provide an improved combination of a photocell and an amplifier for its output in which the light indication is independent of such leakage current.

It is a corollary object of my invention to provide such an arrangement which is simple and rugged and entails no mechanical complexities.

It is furthermore an object of my invention to provide an improved photocell and amplifier arrangement in which nothing except the photoelectric current due to the impinging of radiation upon the photoelectric surface is used to produce an indication.

The features of my invention which I believe to be novel are set forth with particularity in the appended claims. My invention itself, both as to its organization and manner of operation, together with further objects and advantages thereof may best be understood by reference to the following description taken in connection with the accompanying drawing in which:

Figure 1:
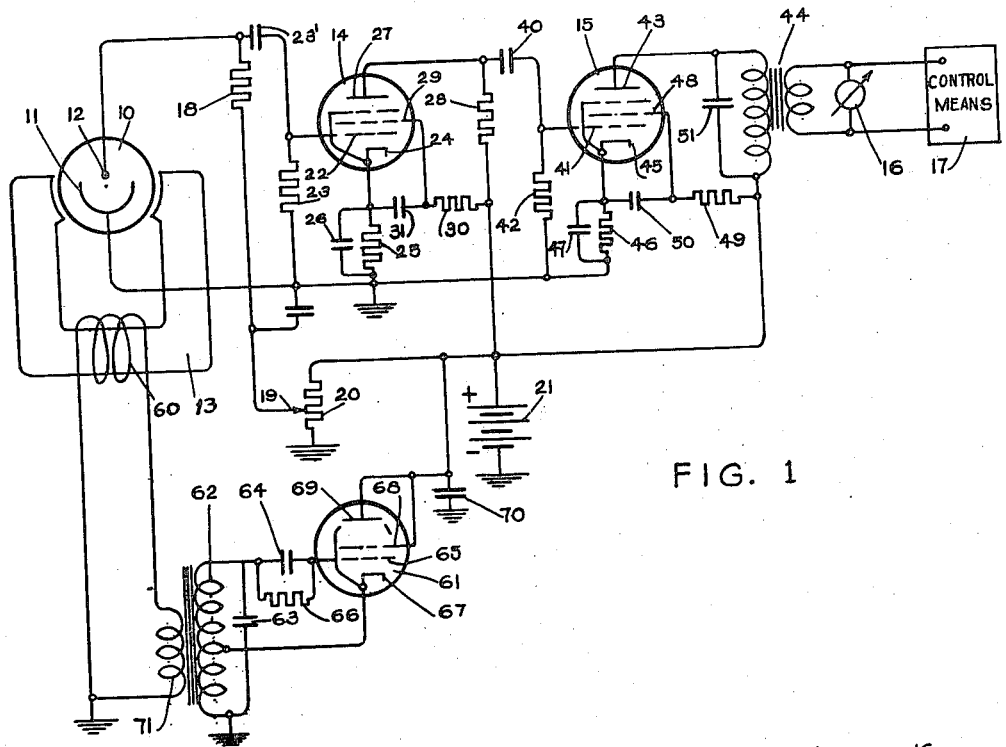
Figure 1 is a preferred embodiment of my invention.

In Figure 1 a photocell 10 includes an electrode 11 whose cylindrical surface is arranged so that light can impinge thereon and so that electrons are emitted from the surface when such light does impinge thereon. Such electrodes are well known and are usually coated with some electron emissive material such as cesium or potassium or the like. The photocell 10 also contains an electron collecting electrode 12 upon which rod a positive potential may be impressed so that the electrostatic gradient between the electrodes 11 and 12 causes electrons emitted by the surface of electrode 11 to be collected by electrode 12.

An electromagnet 13 is arranged to produce an electromagnetic field in the space between the electrodes 11 and 12 perpendicular to the axes of the electrodes so that, when the field is of sufficient intensity, electrons cannot pass from the electrode 11 to the electrode 12. That is, the electron stream from electrode 11 is deflected in its flight from electrode 11 so that it never reaches electrode 12. With fields of less intensity the stream reaches electrode 12 in reduced amount.

The electromagnet 13 is periodically energized so that the electromagnetic field between the electrodes 11 and 12 is alternating in intensity and is of just sufficient intensity to prevent the passage of electrons between electrodes 11 and 12 except during alternate intervals occurring at twice the frequency of the magnet field produced by the magnet 13. While the magnet 13 is described as being arranged to produce such an alternating field, it is to be understood that it can be arranged to produce any kind of alternating field which modulates in correspondence the electron stream intensity. By the provision of this alternating magnetic field between the electrodes 11 and 12, the output current of the photocell 10 is modulated at a frequency which is twice that of the magnetic field, and the output of photocell 10 may then conveniently be amplified through electron discharge amplifier devices 14 and 15, the output of which devices is supplied to a meter 16 for indicating the output of the photocell 10, or alternatively to a control arrangement for producing a control operation in response to the appearance or disappearance of light upon the electrode 11.

It is to be noted that no current flowing through the photocell 10 is modulated except current resulting from the passage of electrons from electrode 11 due to the impinging radiation thereon. Current flows between the electrodes 11 and 12 through the glass envelope of the photocell 10, and that current is of the same order of magnitude as the photocell current itself in the range of low light intensities, and furthermore is a variable factor which cannot satisfactorily be balanced out. In conditions of changing humidity, changing temperature or changing atmospheric pressure, that leakage current through the glass vessel of photocell 10 changes in intensity in an unpredictable manner. It is therefore an advantage of this arrangement that such leakage current is not modulated by the magnet fields produced by the magnet 13 while only the photocell current is so modulated and amplified through the devices 14 and 15.

The arrangement is highly useful in measuring the intensity of any electromagnetic radiation which, impinging on the electrode 10, causes the emission of electrons which are then modulated by the alternating magnetic field produced by the magnet 13 and are amplified through the devices 14 and 15 to be indicated by meter 16 or produce a control operation by the control arrangement 17.

The photometer in detail includes an output circuit for the photocell 10 in which a path may be traced from the electron collecting electrode 12 through a resistance 18, which should be of the order of 10 megohms or higher resistance. The internal resistance of the photocell 10 between the electrodes 11 and 12 is of the order of 1000 megohms or more, and this high internal resistance must be matched by a resistance 18 which is very large. The circuit may be traced further from resistance 18 through a variable path 19 on a voltage dividing resistance 20, which is connected between the positive terminal and the grounded negative terminal of a suitable source 21 of operating voltage for the entire arrangement. The output circuit for the photocell circuit is completed through ground to the grounded electron emitting electrode 11 of the photocell 10.

The control electrode 22 of the device 14 is coupled through a suitable condenser 23', about 200μμ farads in size, to the electron collecting electrode 12 of the photocell 10. The control electrode 22 is connected to ground through a suitable grid resistance 23 which should be of the order of 10 megohms. The resistance 23 should not be larger because of the possibility that the control electrode 22 may produce undesirable effects caused by secondary emission. Because the resistance 23 is not larger than about 10 megohms, the resistance 18 also should not be much larger than that size.

The cathode 24 of the device 14 is connected thru a biasing resistance 25 to ground, the resistance 25 being connected in shunt with a by-passing condenser 26 which serves to maintain cathode 24 at ground potential for alternating voltages. The anode 27 of the device 14 is connected through an output resistance 28 to the positive terminal of the source 21, and a screen electrode 29 of the device 14 is connected through voltage dropping resistance 30 to the positive terminal of the same source 21 and is also connected to the cathode 24 through a by-passing condenser 31 which maintains the screen electrode 29 at cathode potential for alternating voltages.

Alternating voltages appearing between electrodes 11 and 12 by reason of light impinging on electrode 11 and the resulting electron current being modulated by the alternating magnet field from magnet 13 are amplified through the device 14 and appear across resistance 28. Such voltages are coupled through a suitable condenser 40 to control electrode 41 of device 15, which is connected to ground through a suitable grid resistance 42. The alternating voltages are further amplified through the device 15 and appear on the anode 43 which is connected to the positive terminal of source 21 through the primary winding of a suitable output transformer 44. The cathode 45 of device 15 is connected to ground through a biasing resistance 46, connected in shunt with a by-passing condenser 47 which maintains the cathode 45 at ground potential for alternating voltages. The screen electrode 48 of the device 15 is connected through a resistance 49 to the positive terminal of source 21 and is also connected through a by-passing condenser 50 to the cathode 45 so that it remains at the same alternating potential as the cathode 45.

A condenser 51 is connected in shunt with the primary of transformer 44 so that the transformer and condenser are resonant at the frequency of the alternating voltage amplified through the devices 14 and 15. Furthermore, the coupling networks 18, 23, 23' and 28, 40, 42 are given such time constants that they couple most efficiently voltages of the frequency developed between the electrodes 11 and 12 of the photocell 10 by the alternating magnet field from the magnet 13. The meter 16 is connected in shunt with the secondary winding of the transformer 44, and the voltage across that secondary winding of transformer 44 is utilized to produce any desired control operation in the control arrangement 17.

The electromagnet 13 is provided with a winding 60 which may be energized with alternating current from any suitable source, such as an oscillator comprising electron discharge device 61 and circuit 62—63 which is resonant at the frequency of the desired alternating current for energizing the winding 60. One junction of circuit 62—63 is connected to ground and the other junction is coupled through a suitable condenser 64 to the first or control electrode 65 of the device 61 and a suitable grid leak resistance 66 is connected in shunt with condenser 64. The cathode 67 of the device 61 is connected to a suitable tap on the inductance 62 of the tuned circuit 62, 63. The screen grid 68 and anode 69 of the device 61 are connected together and to the positive terminal of the source 21 for the supply of operating current to the oscillator. So connected, the anode 69 of the device 61 is maintained at ground potential for alternating current through a suitable condenser 70 connected between ground and the anode 69, the arrangement being a well-known type of oscillator. The inductance 62 forms the primary of a transformer having a secondary winding 71 which is connected in shunt with the winding 60 of the electromagnet 13. Alternating potentials generated by the oscillator including the discharge device 61 and the resonant circuit 62, 63 are applied across the winding 60 and produce an alternating magnetic field of the desired frequency. It should be noted that the transformer 62, 71 steps down the oscillating voltage and increases the current flowing through the winding 71 and 60, the winding 60 being of a low impedance, high current winding in order to avoid the possibility of any electrostatic influence on photocell current in the photocell 10 or the connected conductors.

Figure 2:
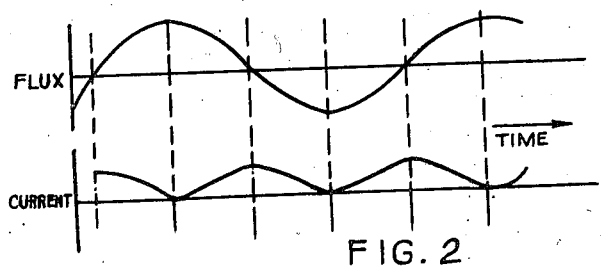
Figure 2 illustrates certain characteristics of the modification of Figure 1.

In Figure 2 the flux densities produced by the coil 60 are plotted as ordinates against time as abscissae and the resulting graph is illustrated as a sine wave. The peak density of this flux is adjusted so that it is sufficient to prevent any electrons from passing from electrode 11 to electrode 12. Preferably, the peak density of this flux is adjusted so that it is just sufficient to prevent the passage of such electrons, for under such conditions of adjustment, maximum efficiency, that is, maximum alternating current output of the photocell 10, is obtained. In the lower part of Figure 2 the current flowing between electrodes 11 and 12 is plotted as ordinates against time as abscissae on the same scale as the flux diagram discussed above. As illustrated, the current flowing between electrodes 11 and 12 is a maximum at every instant when the density of the magnetic field between them is zero, and the current is zero every time the magnetic field is maximum. In other words, the output alternating current of the photocell 10 under these conditions is of a fundamental frequency twice that of the alternating magnetic field.

Figure 3:
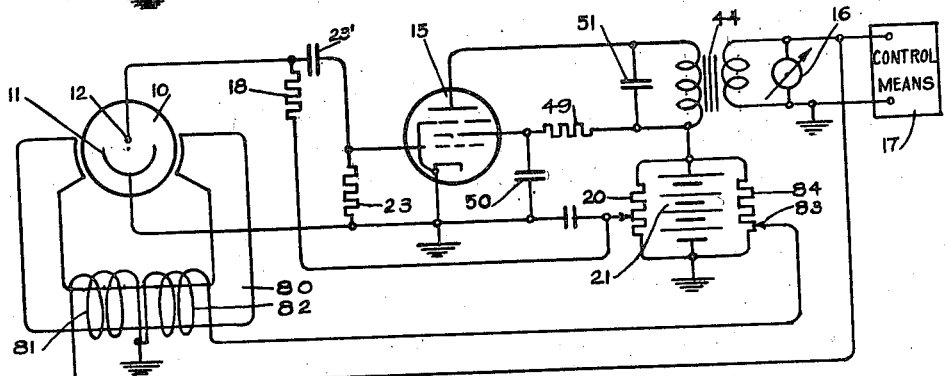
Figure 3 is a modification of the arrangement of Figure 1.

In Figure 3 a modified arrangement is illustrated in which the output of the photocell current amplifier is utilized to produce the magnetic field which modulates the electron current flow in the photocell itself, so that, when no light impinges on the photocell, no oscillations are produced, and, when light impinges on the photocell in sufficient quantity, oscillations are produced of a frequency determined by the circuit constants, and such oscillations are utilized to operate a meter or control arrangement. Many parts in Figure 3 are identical with those illustrated in Figure 1, and like reference characters are applied to them.

A different type of electromagnet 80 is utilized to produce the magnetic field between electrodes 11 and 12 of photocell 10. The electromagnet 80 has two windings 81 and 82. The winding 81 is connected in shunt with the secondary of the transformer 44 to provide a regenerative feed back. The winding 82 is connected between ground and a movable tap 83 of a voltage dividing resistance 84 connected across the source 21. Direct current flowing through the winding 82 is adjusted in intensity to a point of greatest efficiency so that the voltage fed back through the secondary of transformer 44 to the winding 81 is in aiding relation and produces a magnetic field of the same frequency as the voltage produced between the electrodes 11 and 12 of the photocell 10, which voltage is amplified through the device 15 to be fed back again to the winding 81.

In this arrangement it is necessary that a predetermined minimum amount of light impinge on the electrode 11 before sufficient loop gain is present to cause the arrangement to oscillate. The device therefore does not have the great sensitivity of the arrangement of Figure 1, although its sensitivity is much greater than previously known simple photometer arrangements.

Either of the arrangements of Figures 1 or 3 can alternatively be made to produce a voltage between the electrodes 11 and 12 of the same frequency as the magnetic field by utilizing, instead of a winding such as the winding 82 of magnet 80, a shift in the direction of the applied magnetic field to the photocell 10 such that, when the field is in one direction it aids the transfer of electrons between the electrodes 11 and 12, and when it is in the other direction it opposes the transfer of such electrons. In general, the direction of the field under those circumstances would be almost, but not quite, in line with the axis of electrodes 11 and 12.

While the photocell devices 10 in Figures 1 and 3 have been described as envelopes containing a vacuum, it should be understood that photocells containing gases of various sorts and under various pressures produce much the same results when utilized with my magnetic field.

While I have shown and described the particular embodiments of my invention, it will be obvious to those skilled in the art that changes and modifications may be made without departing from my invention in its broader aspects, and I, therefore, aim in the appended claims to cover all such changes and modifications as fall within the true spirit and scope of my invention.

I claim:

1. In combination, the electric circuit including a pair of spaced electrodes, means for producing electron flow between said electrodes and through said circuit in response to the impingement on one of said electrodes of electro-magnetic radiation of energy quanta at least equal to the work function of the material of said one electrode, means for producing undulating magnetic flux in the region of electron flow between said electrodes, the undulations of said flux recurring at a predetermined frequency, said flux being so directed through the region of electron flow as to have at least a component at right angles to the path of electron flow in such region, a narrow band tuned amplifier having input terminals and being resonant at a frequency equal to or a harmonic of said predetermined frequency, and means responsive to electron flow in said circuit for producing a corresponding voltage between said input terminals, whereby said amplifier amplifies only voltages arising from electron flow between said electrodes and not from leakage currents therebetween.

2. In combination, an electric circuit including a pair of spaced electrodes, means for producing electron flow between said electrodes and through said circuit in response to the impingement on one of said electrodes of electro-magnetic radiation of energy quanta at least equal to the work function of the material of said one electrode, means for producing undulating magnetic flux in the region of electron flow between said electrodes, the undulations of said flux recurring at a predetermined frequency, said flux producing means being adjusted to produce flux through such region of such character and direction with respect to the path of electron flow between said electrodes that the resulting undulations of electron flow in said circuit recur at said predetermined frequency, a narrow band tuned amplifier having input terminals and being resonant at said predetermined frequency, means responsive to electron flow in said circuit for producing a corresponding voltage between said input terminals, and means responsive to the output of said amplifier for producing the undulations of said flux at such predetermined frequency, whereby self-sustained oscillations are produced in said amplifier whenever such radiation impinges on said one electrode in sufficient intensity.

3. In combination, an electric circuit including a pair of spaced electrodes, means for producing electron flow between said electrodes and through said circuit in response to the impingement on one of said electrodes of electro-magnetic radiation of energy quanta at least equal to the work function of the material of said one electrode, means for producing undulating uni-directional magnetic flux in the region of electron flow between said electrodes, the undulations of said flux recurring at a predetermined frequency, said flux being so directed through the region of electron flow as to have at least a component at right angles to the path of electron flow in such region, a narrow band tuned amplifier having input terminals and being resonant at such predetermined frequency, means responsive to electron flow in said circuit for producing a corresponding voltage between said input terminals, and means responsive to the output of said amplifier for producing the undulations of said flux at said predetermined frequency, whereby no special source of oscillations is necessary to produce such undulations.

4. In combination, an electric circuit including a pair of spaced electrodes, means for producing electron flow between said electrodes and through said circuit in response to the impingement on one of said electrodes of electro-magnetic radiation of energy quanta at least equal to the work function of the material of said one electrode, means for producing undulating magnetic flux in the region of electron flow between said electrodes, the undulations of said flux recurring at a predetermined frequency, said flux being so directed through the region of electron flow as to have at least a component at right angles to the path of electron flow in such region, said flux producing means comprising a coil of low impedance adjacent said electrodes and energized from a source of undulating current of large amplitude and low voltage whereby said flux is produced with minimum electrostatic field in the region of electron flow between said electrodes and consequently negligible electrostatic effect on the electron flow in said circuit, a narrow band tuned amplifier having input terminals and being resonant at a frequency equal to or a harmonic of said predetermined frequency, and means responsive to electron flow in said circuit for producing a corresponding voltage between said input terminals, whereby said amplifier amplifies only voltage arising from electron flow between said electrodes and not from leakage currents therebetween or from electrostatic induction.

5. In combination, an electric circuit including a pair of spaced electrodes, means for producing electron flow between said electrodes and through said circuit in response to the impingement on one of said electrodes of electro-magnetic radiation of energy quanta at least equal to the work function of the material of said one electrode, means for producing alternating magnetic flux in the region of electron flow between said electrodes, the alternations of said flux recurring at a predetermined frequency, said flux being so directed through the region of electron flow as to have at least a component at right angles to the path of electron flow in such region, a narrow band tuned amplifier having input terminals and being resonant at the second harmonic of said predetermined frequency, and means responsive to electron flow in said circuit for producing a corresponding voltage between said input terminals, whereby said amplifier responds only to modulation of the electron flow between said electrodes by said flux and is not affected by leakage currents or electrostatic influences by said flux producing means.

HENRY P. KALMUS.

REFERENCES CITED

The following references are of record in the file of this patent:

UNITED STATES PATENTS

| Number | Name | Date |
|---|---|---|
| 1,894,023 | Dawson | Jan. 10, 1933 |
| 1,939,060 | Kinsbury | Dec. 12, 1933 |
| 2,189,122 | Andrews | Feb. 6, 1940 |
| Re. 18,400 | Gray | Mar. 29, 1932 |